Aug. 18, 1964   HANS-RICHARD SCHULZ   3,145,264
DEVICE FOR THE REMOVAL OF THE LINE
STRUCTURE OF TELEVISION PICTURES
Filed Dec. 20, 1960   8 Sheets–Sheet 1

INVENTOR
HANS-RICHARD SCHULZ

By Toulmin & Toulmin,
Attorneys

Aug. 18, 1964   HANS-RICHARD SCHULZ   3,145,264
DEVICE FOR THE REMOVAL OF THE LINE
STRUCTURE OF TELEVISION PICTURES
Filed Dec. 20, 1960   8 Sheets-Sheet 3
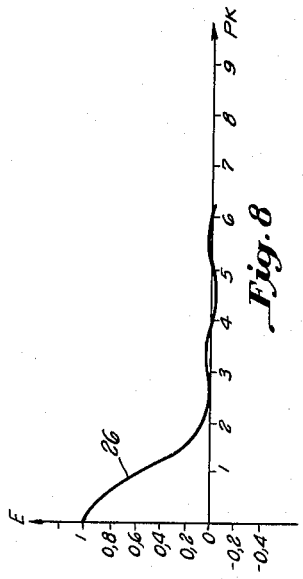
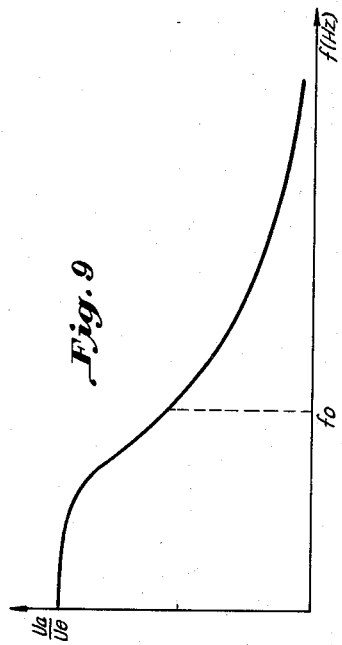
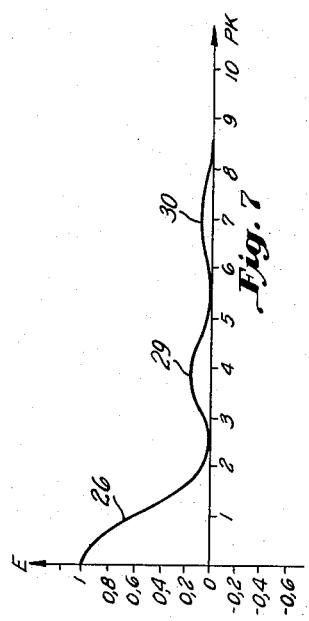
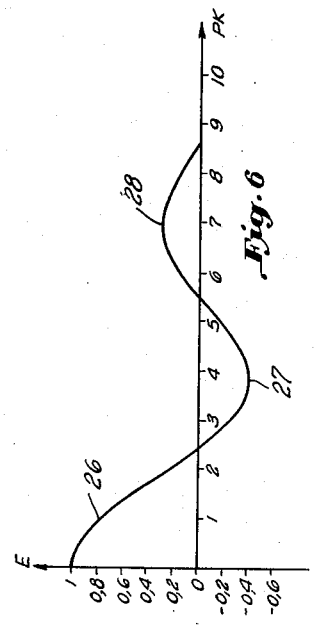
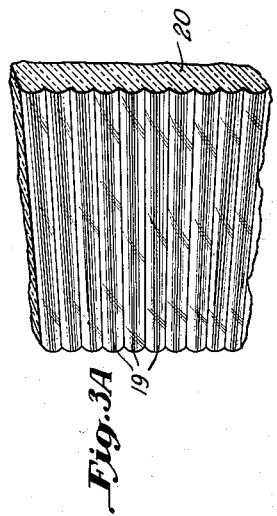
INVENTOR
Hans-Richard Schulz
BY Toulmin & Toulmin
ATTORNEYS

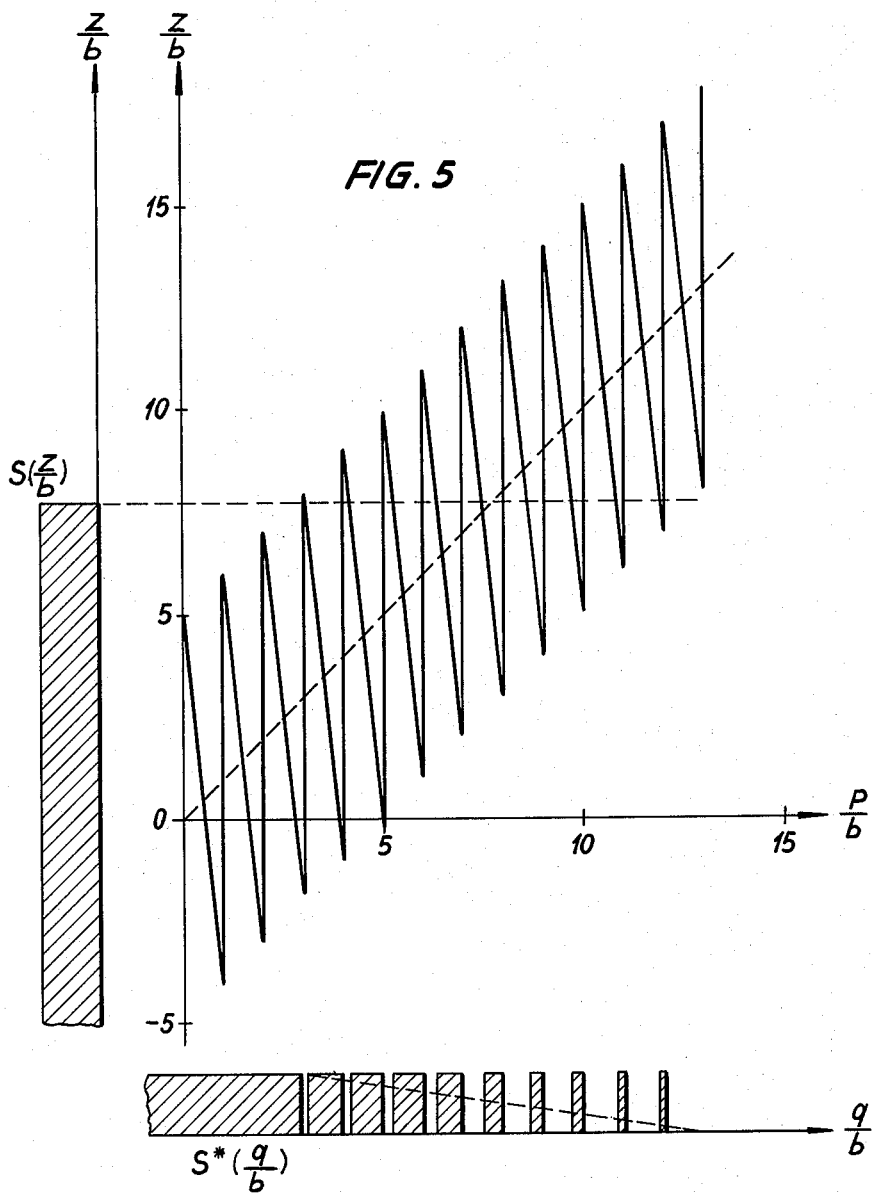

Aug. 18, 1964    HANS-RICHARD SCHULZ    3,145,264
DEVICE FOR THE REMOVAL OF THE LINE
STRUCTURE OF TELEVISION PICTURES
Filed Dec. 20, 1960    8 Sheets-Sheet 7

INVENTOR
HANS-RICHARD SCHULZ

By Toulmin & Toulmin
Attorneys

United States Patent Office 3,145,264
Patented Aug. 18, 1964

3,145,264
DEVICE FOR THE REMOVAL OF THE LINE STRUCTURE OF TELEVISION PICTURES
Hans-Richard Schulz, Villingen, Black Forest, Germany, assignor to SABA Schwarzwalder Apparate-Bau-Anstalt August Schwer Sohne G.m.b.H., Villingen, Black Forest, Germany
Filed Dec. 20, 1960, Ser. No. 77,062
Claims priority, application Germany, Dec. 21, 1959
12 Claims. (Cl. 178—7.85)

The present invention relates to a device for the optical removal of the line structure visible in pictures on the video screen of television tubes, and the invention furthermore relates to a method of making such device.

It is the primary object of the present invention to improve the above mentioned device and its manufacturing in relation to that what is known up to date.

It is a further object of the present invention to remove the well-known phenomena caused by the line structure, especially of the flickering inbetween lines, the illusion of a vertical migration of lines and the so-called stair effect.

The line structure of a television picture is of course more visible at larger video screen and the closer the person watching the screen is sitting with respect thereto. In other words, the line structure is more visible if the angle of vision with which the viewer sees a single line becomes larger.

The flickering in the space between lines is a frequently observed disturbance of a television picture. In view of the usually employed interlaced scanning method this flickering occurs as vertical oscillation at a frequency of about 30 cycles per second.

The vertical migration of a line is a result also of the interlaced scanning. This migration is based upon the accommodation of the human eye to one particular line. This creates the illusion in the observer that a line raster including half of the number of lines migrates upwardly or downwardly. This phenomenon is particularly disturbing in case of vertical movements in the scenery of the picture.

The "stair" effect is that peculiarity of line rasters wherein picture lines form a small angle with the horizontal raster lines so as to produce a stairway type distortion of the picture.

The picture distortions as discussed would not be visible anymore if the electron beam scanning the fluorescent layer of the television screen has the cross-section of a standing rectangle while the brightness as produced thereby follows a distribution according to a $\cos^2$ law; if in such a case neighboring lines overlap, no line structure could be visible. However, the presently employed wide angle tubes do not permit electron beams of rectangular cross-sections. Such operating conditions may be fulfillable in laboratory tests using receivers in which is produced a so-called line wobbling at a very high frequency, for example 20 megacycles; however, this method necessitates such a large expenditure that it is uneconomical and furthermore the result is still not completely satisfactory.

It is an object of the present invention to provide an economical and reliable, but simple device for optically removing the line structure of a picture on a television screen.

It is another object of the instant invention to remove or render invisible the presently well known light disturbances on TV screens which are due to the interlaced scanning method.

It is a further object of the instant invention to provide purely optical means for the removal of the line structure of the television picture, which means can be added to any television set even after its completion whereby no change in the electric circuitry of the TV set is needed.

It is a still further object of the invention to provide suitable methods for manufacturing plates producing limited and predetermined optical refraction in parallel planes.

According to one aspect of the present invention in a preferred embodiment thereof it is suggested to provide a grooved, transparent brightness distributing plate where the grooves are of regular structure and extend primarily in the direction of the extension of the lines in the television picture; such plate is to be positioned inbetween the television picture screen and the viewer.

While the specification concludes with claims particularly pointing out and distinctly claiming the subject matter which is regarded as the invention it is believed that the invention, the objects of the invention and further objects and advantages thereof will be better understood by the following description taken in connection with the accompanying drawings in which:

FIGURE 3A is a perspective view of the deflection of this invention and shown in FIGURE 3;

FIGURE 5 illustrates graphs of the brightness distribution and other optical phenomenon as occurring with a brightness distributing plate as illustrated in FIGURE 4;

FIGURES 6, 7 and 8 are graphs illustrating the visibility of the line structure with various profiles for brightness distributing plates in accordance with the present invention;

FIGURE 9 illustrates a graph of the frequency response for a device utilized for making brightness distributing plates in accordance with the invention;

Figure 1:
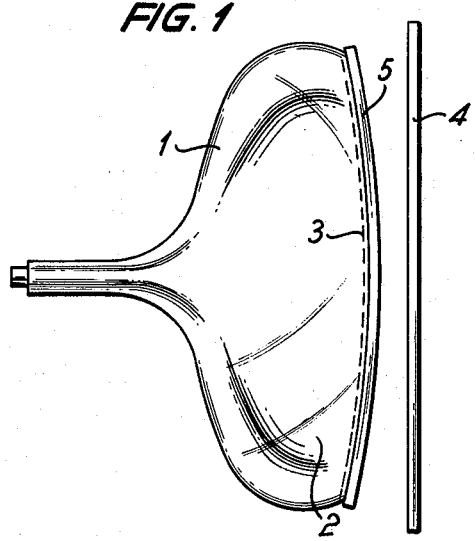
FIGURE 1 is a schematic side view of a television tube being provided with a device in accordance with the instant invention.

Turning now to the detailed description of the drawings, particularly FIGURE 1, there is illustrated a television picture tube 1 having a fluorescent layer 3 on the inside thereof thus defining the video screen 2. Outside of the tube and in front of the screen 2 is positioned a protective front plate 4 which usually is combined with the wooden structure of the cabinet housing the television picture tube and its necessary circuitry. This cabinet is not shown and it is conventional. Furthermore, the electrical circuitry operating tube 1 is also not shown, and it is also of conventional design.

Figure 2:
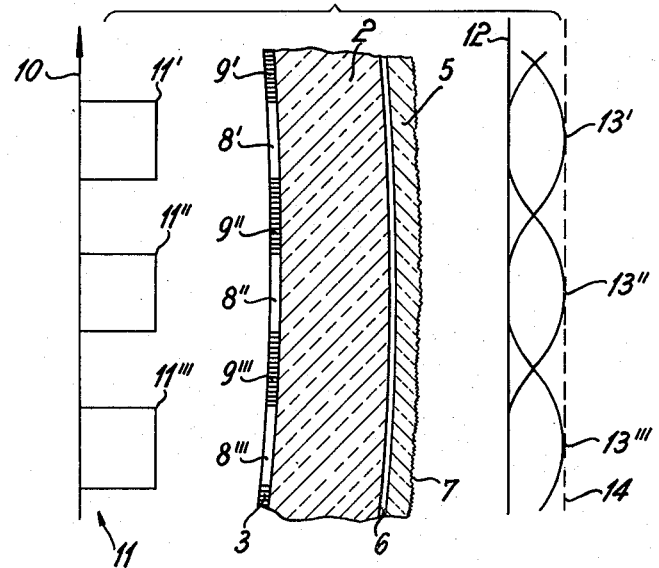
FIGURE 2 illustrates a cross-sectional view of an enlarged portion of the device shown in FIGURE 1 and includes graphs of several brightness distributions associated with such portion.

An enlarged portion, particularly a cross-section through the screen of the picture tube 1 is illustrated in the center of FIGURE 2. It can be seen, a grooved brightness distributing plate 5 is positioned directly in front of the screen 2 thus having a predetermined small distance from the fluorescent layer 3. The plate 5 follows the curvature of the screen 2 and thus retains a constant or uniform distance from this fluorescent layer 3. Plate 5 is mounted directly on screen 2 and adhered thereto by means of a transparent glue or cement, whereby an adhesion layer 6 is defined.

The screen 2 forming part of the tube 1 consists of glass and the grooved brightness distributing plate 5 may consist of glass or transparent plastic. The cement layer 6 is to have the same index of refraction as the glass.

If the plate 5 is not made of glass, it is to have the same refractory index as the glass of the screen 2 and as the cement layer 6 in order to avoid refraction at the boundaries; in other words, plate 5, screen 2 and cement layer 6 are to have equal optical density.

The plate 5 is provided with small grooves visible in FIGURE 2 as wave line 7. Accordingly, the grooves extend perpendicularly to the plane of the drawing. It is furthermore assumed that the scanning lines on the television video screen also extend substantially perpendicular to the plane of the drawing.

During operation, the fluorescent layer 3 is scanned by an electron beam of the picture tube in a manner known per se, whereby the fluorescent layer 3 is excited for example at areas designated with 8', 8" and 8''' (FIGURE 2), leaving dark, i.e. unexcited areas 9', 9" and 9''' inbetween. Thus, the areas 9', 9" and 9''' denote locations where bright lines are produced by the impinging of electron beams. The brightness of the light resulting therefrom is schematically indicated at the left-hand side of the FIGURE 2, whereby the brightness distribution is produced plotted along on axis 10. Reference numerals 11', 11" and 11''' denote single brightness areas corresponding to the excitation of areas 8', 8" and 8''', respectively.

The right-hand diagram shown in FIGURE 2 is in aligned relationship with the diagram of the left-hand side thereof as well as the various excited and unexcited areas of layer 3, illustrate the influence of the grooves of brightness distributing plate 5 upon the particular brightness distribution of the fluorescent layer 3. This brightness is changed by the grooves 7 so as to form $\cos^2$-curves 13', 13" and 13'''; each simple curve thereof results from the refraction produced by the grooved plate 5 whereby a sharp, single line on fluorescent layer 3 is refracted over a larger area in vertical direction. The overall brightness of the several lines as now actually visible on this grooved plate 5 results from the overlapping portion of the curves 13', 13" and 13''' cancelling the dark portions, 9', 9" and 9'''.

The overall brightness as visible to the human eye is illustrated schematically by the dashed line 14, indicating that there is no substantial decrease in brightness inbetween lines. This, of course, is due to the assumption that all three lines are originally of similar brightness as indicated in the left-hand diagram of the brightness distribution 11. If neighboring lines are of dissimilar brightness, thus defining a contrast, this contrast will be visible now on plate 5 directly without interruption by dark areas between lines and no line structure is recognizable.

The grooves 7 on plate 5, as already stated above, extend perpendicularly to the plane of the drawing in the same or in substantially the same direction as the extension of the picture lines whereby the distance between adjacent grooves is smaller than the distance between neighboring lines. The grooves as employed in this particular instance have such width and such depth that their "smoothing" effect upon the excited portions 11', 11", 11''' of the fluorescent layer 3 results in a light distribution perpendicularly to the extension of the lines, so that light portions of the neighboring lines will overlap themselves.

In order to avoid any loss of light the plate 5 is glued to the screen 2 by means of a cement having the same refractory index as the plate 5 and the glass of screen 2. It has been found to be of high advantage if so-called "canada balsam" is used as such glue.

The protective front plate 4 can actually be omitted and its function can be combined with that of the grooved plate 5 for simplifying the construction of the television set. It is furthermore possible to add color additives to the material of plate 5 in order to improve the contrast of the picture appearing thereon.

Alternatively, the screen 2 and the plate 5 can be combined so that the outer surface of the screen 2 is itself provided with grooves such as 7, thus serving directly as an optical brightness distributing plate improving the picture quality as produced on the fluorescent layer 3.

For the usual 17", 21" or 24" screens as presently employed in television receiver sets, it has been found that grooves of an average width or cross-sectional diameter of about $\frac{1}{10}$ of a millimeter with a distance of adjacent grooves of also about $\frac{1}{10}$ of a millimeter produce the desired brightness distributing effect by refraction. It has been found particularly that when a plate such as 5, having a profile as defined by grooves is positioned in front of the television screen, so that the grooves are parallel to the line structure, the line structure as well as the "stairway" effect vanish completely and are not visible anymore by the viewer. The sharpness of the picture in direction of the lines is not influenced thereby. The plate is of a transparent material, has an index of refraction of $n \neq 1$, and is several millimeters in thickness.

Of course, it is possible, with a plate having the principal design according to the instant invention to produce a brightness distributing effect also in horizontal direction, if it is desired that single image points are to be "smoothed" in horizontal direction. In this case, the grooves of the brightness distributing plate have to run, in general, in vertical direction whereby the degree of brightness distribution in horizontal direction can be selected suitably, for example in lessening or increasing the depth of the vertical grooves as compared with the horizontal grooves necessary to have the line structure of the picture removed.

Of course, these features can be combined in providing a plate such as 5 with horizontally extending grooves having sufficient width and depth to smooth out and remove the line structure of the visible image by vertical deflection; in addition, a horizontal deflection is produced by vertically extending grooves generally having a depth smaller than the depth of the horizontal grooves. In this case the entire plate has a lattice-type surface structure and operates accordingly. Of course, one has to consider that the edges everywhere be sufficiently small as compared with the distances between two lines on the video screen in order to avoid interference effects by overlapping deflection.

A brightness distributing plate having grooves as illustrated in FIGURE 2 can be used to remove the line structure of a television picture whereby any kind of configuration for such grooves may be employed. In other words, there is no particular type of groove necessary to exhibit the desired effect. However, it has been found that light losses which are principally inevitable with such type of plate, can be reduced to a considerable extent, and any possible influence of the plate on the sharpness of the picture can also be reduced or even completely be removed, if the surface structure of this plate 5 follows predetermined mathematical relations.

The mathematical relations will be explained more fully in connection with FIGURE 3 in which 17 is the surface of the screen in which the image appears to the viewer; 20 is a grooved brightness distributing plate employed in this case, having its inwardly directed surface provided with a profile designated with reference numeral 19. The direction pointing towards the viewer is designated with $x$; $a$ is the distance between the surface on which appears the picture 17, and the average distance of profile 19 from this illuminating layer 17.

The primary condition is that the brightness distributing plate shall have such surface structure that the deflection of the direction perpendicular to the extension of the lines, changes the distribution of brightness density on the screen to such other distribution that the following equation is fulfilled:

(1) $$S^*(q) = S(q - a \cdot (n-1) \cdot dp/dq)$$

In this equation S is a function describing the brightness density in dependence upon a coordinate of extension, for example in the vertical direction. If $z$ is a coordinate in vertical direction on a plane (here the plane of the drawing) perpendicular to the screen and running therethrough, then $S(z)$ describes the brightness distribution along that line on the screen. $S^*(q)$ describes the light distribution visible for a viewer whereby $q$ is a coordinate on the surface of the plate 20 in the same plane which includes $z$, as defined above. $q$ and $z$ are parallel coordinates. $p$ is a function of the surface profile, $n$ is the index of refraction of the material of plate 20.

The grooves defining the profile 19 change the distribution of the brightness density $S(z)$ as produced along the $z$ axis on screen surface 17, into distribution $S^*(q)$ visible for a viewer, the eye of which is schematically illustrated.

The conditions present can be summarized in the following manner:

(1) The viewer is located so far from the plate 20 that only such rays have to be considered as an approximation of the first order, which rays are perpendicular to the outer surface 19a of plate 20.

(2) The maximum refraction of rays coming from surface 17 which refraction is produced by refraction at the profile 19 is still only present in the range of small angles, which means angles smaller than, for example, 20°, so that the sine and tangent functions can be substituted by the angles themselves. Thus it can be assumed $$\sin \varphi \cong \varphi \qquad \tan \varphi \cong \varphi$$

(3) The dependency of the brightness density upon the angle of incidence according to the Lambert law can be neglected, so that the change from $S(z)$ to $S^*(q)$ will only be produced by a transformation of coordinates following the equation $z = f(q)$. For calculating this transformation of coordinates the following definitions will be used as follows (see FIGURES 3 and 4):

$\varphi$, angle of deflection of a ray measured against the X axis;
$\alpha 1$, angle of incidence for a light ray beam at any given spot (for example 16) at the profile 19;
$\alpha 2$, angle of refraction at the same spot;
$\beta$, angle between the tangent at the point 16, having coordinates $(a, q)$ and the direction of $q$;
$p$ is a function describing the profile 19 of plate 20 along the direction $q$, thus $p = p(q)$;
$n_1$, index of refraction for air ($=1$);
$n_2$, the index of refraction for the material used for plate 20 which is different from the index refraction $n_1$.

Considering now FIGURES 3 and 4 together, the transformation of coordinates can be deducted as follows:

The viewer looks, for example, towards a point 18 of the layer 17. This point 18 has the coordinates $(o, q)$ and he appears to see a brightness density at that point of $S^*(q)$, but actually, he sees a brightness originated at 18', having the coordinates $(o, q - a \cdot \tan \varphi)$. The light coming from 18' is deflected by refraction at the plate 20, particularly at point 16 having the coordinates $(a, q)$ which deflection is produced by a refraction when the ray passes through the boundary air-plate 20.

This deflection can be calculated under the utilization of the well-known laws of refraction. The slope of the curve describing the profile 9 at point 16 is given by (2) $$\tan \varphi = \frac{dp}{dq}$$

Then the following equations are true:

(3) $$n_1 \cdot \sin \alpha_1 = n_2 \cdot \sin \alpha_2$$
(4) $$\alpha_1 \cong n \cdot \alpha_2 \cong n \cdot \beta$$
(5) $$\varphi = \alpha_1 - \alpha_2 \cong (n-1) \cdot \alpha_2 = (n-1) \cdot \beta$$
(6) $$\varphi \cong (n-1) \cdot \tan \beta = (n-1) \cdot \left(\frac{dp}{dq}\right)$$

The transformation of the coordinates then results in:

(7) $$z = q - a \cdot \tan \varphi \cong q - a(n-1) \cdot \left(\frac{dp}{dq}\right)$$

The relation between the distribution of brightness density $S^*(q)$ actually visible for the viewer observing directly only the grooved plate 20, is related to the distribution of brightness density actually present at layer 17 according to the following equation:

(8) $$S^*(q) = S\left(q - a(n-1) \cdot \frac{dp}{dq}\right)$$

This relationship for the effect of brightness distributing plate 20 is correct for any profile 19 of such plate. Thus, the validity of this equation is not dependent upon any particular configuration of this profile 19. Of particular interest are periodic profiles as, for example, illustrated in FIGURES 3 and 4. In the drawing the distance between two adjacent grooves is designated with $b$ which, of course, in case of a periodic profile, is a constant characteristic for such plate; in this particular instant a parabolic profile is assumed; thus, in FIGURE 4, 19' is a parabolic arc separating two grooves. Periodic profiles can be described by the following general equation:

(9) $$p = \sum_{y=1}^{y=\infty} C_y \cdot \sin\left(2\pi \cdot y \cdot \frac{q}{b}\right)$$

whereby $y$ is the index designating the order of each member in this sum.

It has been found that for a satisfactory suppression of the line structure of the television picture a chain of parabolic arcs is particularly suitable if used so as to define a periodic profile. This will be explained more fully in connection with a graphical solution of Equation 8 which is illustrated in FIGURE 5. If we therefore assume that the arc 19 (FIGURE 4) is a parabolic one, and if T is the depth of a single groove, such parabolic profile can be described by the following equation, wherein $q_m$ represents the "n"th coordinate of $q$.

(10) $$p = 4 \cdot \frac{T}{b^2} \cdot (q - q_m)^2$$

With the aid of this equation the slope of the profile at any point, for example point 16 having coordinates $(a, q)$ is given by

(11) $$\left(\frac{dp}{dq}\right) = 8 \cdot \frac{T}{b^2} \cdot (q - q_m)$$

The maximum slope is:

(12) $$\left(\frac{dp}{dq}\right) = 8 \cdot \frac{T}{b^2} \cdot \frac{b}{2} = 4 \cdot \frac{T}{b}$$

According to Equation 7 the width $l$ of diffraction of light can now be calculated with the aid of Equation 12:

$$(13) \quad l = a(n-1) \cdot 4\frac{T}{b}$$

Taking Equations 13 and 11 together:

$$(14) \quad \left(\frac{dp}{dq}\right) = \frac{2 \cdot l}{a \cdot (n-1) \cdot b} \cdot (q - q_m)$$

If Equation 14 is substituted into Equation 7 we obtain:

$$(15) \quad z = q - 2 \cdot \frac{l}{b}(q - q_m)$$

If we use coordinates normalized in $b$, Equation 15 can be rewritten as follows:

$$(16) \quad \frac{z}{b} = \frac{q}{b} - 2\frac{l}{b} \cdot \left(\frac{q}{b} - \frac{q_m}{b}\right)$$

Under the assumption of $q = m \cdot b$ (wherein $m$ = an integer which is a multiplier) and $l/b = 5$ the transformation curve according to Equation 16 is being calculated and is plotted in the upper part of FIGURE 5. The curve is a diagram plotted for $q/b$ with respect to $z/b$.

By help of this general coordinate transformation the black-white step illustrated in FIGURE 5 at the left-hand column has been graphically found out and shown in FIGURE 5 below. This black-white step is an especially assumed brightness density distribution $S(z/b)$. The resulting brightness distribution $S^*(q/b)$, shown in FIGURE 5 below, is as mentioned before a graphical solution of the equation describing the transformation of coordinates for a parabolic profile such as illustrated in FIGURE 4. The function $S^*(z/b)$ thus obtained is plotted in the lower diagram of FIGURE 5. This plot shows that the originally black-white step is transformed into a plurality of black and white stripes of variable width, their number being approximately equal to $2 \cdot l/b$. Hereby in one direction the width of the black stripes increases and the width of the white stripes decreases. The width of each of the stripes is so small that any viewer located sufficiently far from the plate 20 (FIGURE 3) does not see any individual stripes, but he sees only a gradually decreasing or increasing brightness distribution indicated by a dashed line in FIGURE 5. Thus, one can say that the vewer visually integrates the various stripes and imagines a uniform change in brightness. This, of course, necessitates a sufficiently small value for $b$, then the average light distribution seen by the person observing screen 20 results in a continuous flattened black-white change reaching over a $2 \cdot l$ transition zone.

Such black and white transition zones can be observed at the upper and the lower edge of any scanning line on the video screen, in the intermediate space between two adjacent lines; this particular transition shown in FIGURE 5 is produced if a grooved plate having a parabolic surface profile is positioned in front of the picture screen. The most favorable degree of deflection is obtained if the effective width of deflection which corresponds to two transition zones for one scanning line, equals or is somewhat larger than the average distance between two neighboring scanning lines.

It has been found, that best results be obtained if the distance $b$ of neighboring grooves are about $\frac{1}{5}$ to $\frac{1}{20}$ of the distance of neighboring lines on the screen which, of course, depends on the size of the screen; the depth $T$ is to be about $\frac{1}{10}$ of the width $b$.

It is also possible to produce a diffraction effect with a plate not having a periodically grooved profile but having a statistical distribution of the effective angle of refraction, if one assumes that the average distance between neighboring grooves is small as compared with the distance between neighboring scanning lines. Such a statistical distribution of the angles of refraction can be made very simply if one makes grooves by sanding an originally smooth surface for such plate 5 (FIGURE 1), whereby the grain of the sandpaper is small as compared with the average distance between neighboring television picture scanning lines. Of course, the sanding must be carried out so that the grooves still are all running in parallel.

Such profile also extinguishes the line structure by refraction; however, one has to consider that in this case of a merely statistical distribution of angles of refraction, one will obtain at some spots total reflection so that a considerable loss of brightness for the viewer is inevitable.

Periodical, especially parabolic profiles such as discussed in connection with FIGURES 3, 4 and 5 avoid such total reflection so that brightness distributing plates having such parabolic profiles are considerably better for optically removing the line structure because they do not produce any appreciable decrease in brightness of the picture as compared with the brightness present directly on the fluorescent screen.

Figure 3:
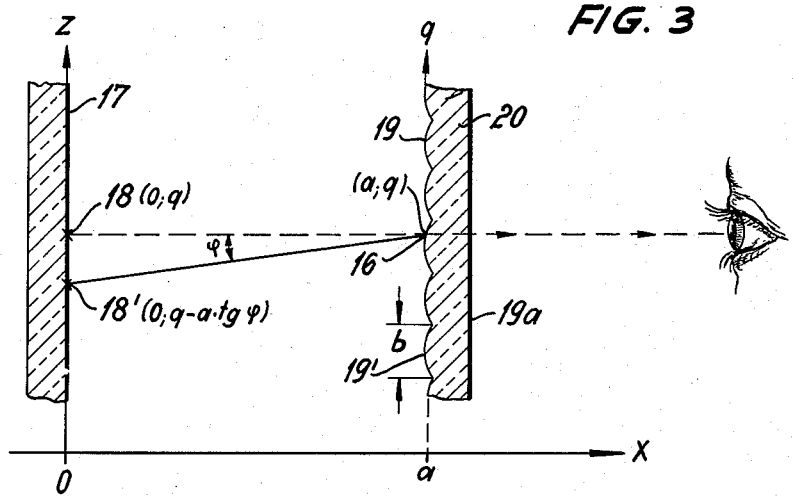
FIGURE 3 illustrates a schematic cross-sectional view of a system according to the instant invention including an eye of a viewer, a brightness distributing plate in accordance with the present invention and a video sceen of a television tube.
Figure 4:
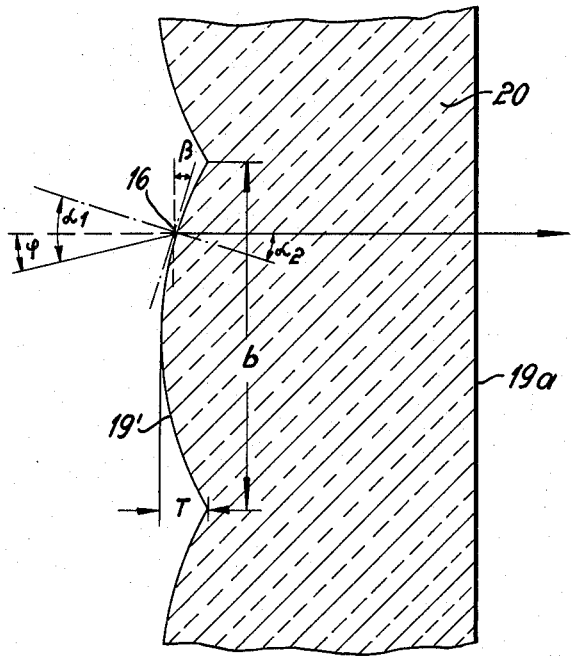
FIGURE 4 illustrates an enlarged portion of a cross-section through a plate in accordance with one embodiment of the present invention, illustrated in FIGURE 3.

It has been found that plates such as 5 in FIGURES 1 and 2, or 20 in FIGURES 3 and 4, when combined with the television set as a whole, require a particular optimum distance between the profile itself and the fluorescent layer of the TV screen. This distance must be kept constantly very accurate, with a range of tolerance not exceeding $\pm = 4\%$. If this tolerance is exceeded, the line structure will be visible again, for example, when the distance between profile and screen exceeds the predetermined distance.

The visibility of the line structure increases, considering only first order phenomenon, linearly with the deviation from the optimum distance. In case of mass production, one has to take into account that distance tolerances of up to about 25% for combining the grooved plate with the television set might have to be taken into consideration and therefore a certain difficulty may occur.

On the other hand, if brightness distributing plates are treated in a manner outlined above with sand paper or the like, not having a periodic profile but a statistical distribution of angles of refraction, the above mentioned difficulty does not occur. Such plates remove the visibility of the line structure even in case of a variable distance between plate and screen. However, by help of this comparatively primitive plate for removing the line structure no predetermined maximum width of deflection is to be obtained, and light losses and reduction in sharpness are inevitable.

According to another embodiment of the instant invention, however, it is possible to combine the advantage of a periodically profiled plate, having for example parabolic configuration, and producing very accurately a predetermined width of diffraction, with the advantage of the relative insensitivity of a sanded plate, to be relatively independent on changes in the distance between this plate and the fluorescent screen. This improvement is explained in connection with FIGURES 6, 7 and 8 as well as 9; respective structures and methods of making such structures will be illustrated in FIGURES 6A, 7A, 8A, 10, 11 and 12.

Figure 6A:
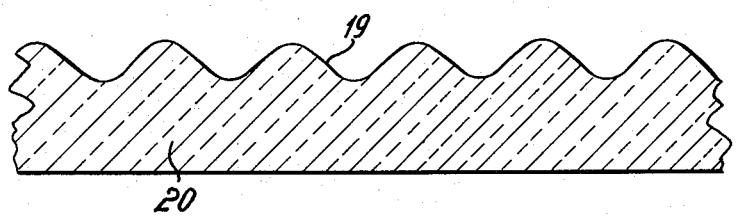
FIGURES 6A, 7A and 8A are partial sectional views of the plates producing the graphs of FIGURES 6, 7 and 8, respectively.
Figure 7A:
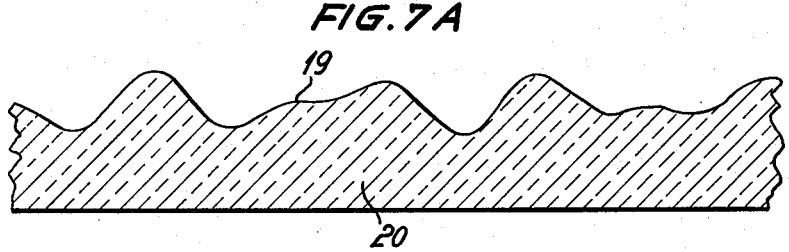
Figure 8A:
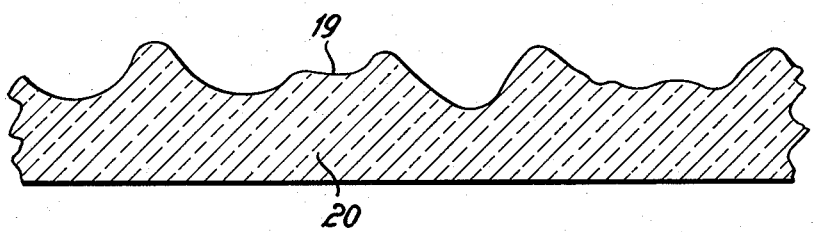

FIGURES 6, 7 and 8 show graphically the perceptibility, i.e. the degree to which the objectionable line structure is visible to the viewer, obtained with brightness distributing plates whose grooves have a profile in form of a single sine wave (FIGURE 6A), wherein said profile comprises two superposed sine waves (FIGURE 7A), and wherein said profile is formed by superposing three sine waves (FIGURE 8A).

The wave lengths of the superposed sine waves are so selected that the difference between these wave lengths is comparatively great. If the distance of the diffraction plate from the fluorescent screen is gradually increased, there will occur repeating values of the perceptibility E. By mathematical analysis, the perceptibility E can be computed, in a first approximation for a whole number of superposed waves, by the product of N times a Bessel function of the zero order. These Bessel functions are derived as follows:

A $\cos^2$-shaped vertical distribution of the luminous density (1) $\qquad S(z) = L + L \cdot \cos\left(\frac{2\pi}{D} \cdot z\right)$ having a pitch D and an average luminous density L is presupposed.

Two sinus-shaped wave-trains, superposing each other and having different wave lengths ($b_1 : b_2$) are to be chosen as a profile in the following form:

(2) $\qquad p(q) = A_1 \cdot \cos\left(\frac{2\pi}{b_1} \cdot q\right) + A_2 \cdot \cos\left(\frac{2\pi}{b_2} \cdot q\right)$ Then follows as a function of dispersion:

(3) $\qquad z(q) = q - a \cdot (n-1) \cdot \frac{dp}{dq}$ $= q + a \cdot (n-1) \cdot A_1 \cdot \frac{2\pi}{b_1} \cdot \sin\left(\frac{2\pi}{b_1} \cdot q\right)$ $+ a \cdot (n-1) \cdot A_2 \cdot \frac{2\pi}{b_2} \cdot \sin\left(\frac{2\pi}{b_2} \cdot q\right)$ The abbreviations (4) $\qquad K = 4 \cdot \pi^2 (n-1) \cdot \frac{a}{D};\ P_1 = \frac{A_1}{b_1};\ P_2 = \frac{A_2}{b_2};\ u = \frac{2\pi}{D} \cdot q$ express the distribution of the luminous density (5) $\qquad S^*(u) = L + L \cdot \cos\left(u + P_1 \cdot K \cdot \sin\left(\frac{D}{b_1} \cdot u\right)\right.$ $\left. + P_2 \cdot K \cdot \sin\left(\frac{D}{b_2} \cdot u\right)\right)$ visible to the observer.

The first Fourier's coefficient of the Fourier's analysis of $S^*(u)$ made in the first phase D and related to the average luminous density L has to be defined as the distinguishing function E:

(6) $\qquad S^*(u) = \sum_{m=0}^{\infty} g_m \cdot \cos(m \cdot u)$ becomes (7) $\qquad E = \frac{g_1}{L} = \frac{1}{\pi} \cdot \int_0^{2\pi} \frac{S^*(u)}{L} \cdot \cos u \cdot du$ $= \frac{1}{2\pi} \cdot \int_0^{2\pi} \cos\left(P_1 \cdot K \cdot \sin\left(\frac{D}{b_1} \cdot u\right) + P_2 \cdot K \cdot \sin\left(\frac{D}{b_2} \cdot u\right)\right) \cdot du$ $+ \frac{1}{2\pi} \int_0^{2\pi} \cos\left(2u + P_1 \cdot K \cdot \sin\left(\frac{D}{b_1} \cdot u\right)\right.$ $\left. + P_2 \cdot K \cdot \sin\left(\frac{D}{b_2} \cdot u\right)\right) \cdot du$ In order to abbreviate the further computation of this integral equation it is stated that for the case realized in practice ($b_1 \ll D$; $b_2 \ll D$) the above relation is simplified in the first approximation to the integral equation:

(8) $\qquad E \approx \frac{1}{2\pi} \int_0^{2\pi} \cos\left(P_1 \cdot K \cdot \sin\left(\frac{D}{b_1} \cdot u\right)\right) \cdot \cos\left(P_2 \cdot K \cdot \sin\left(\frac{D}{b_2} \cdot u\right)\right) \cdot du$ if $b_2$ is distinctly different from $b_1$.

With the known formula:

(9) $\qquad \cos(\alpha \cdot \sin \beta) = J_0(\alpha) + 2 \sum_{u=1}^{\infty} J_{2u}(\alpha) \cdot \cos(2u \cdot \beta)$ $\approx J_0(\alpha);\ (\alpha \ll 5)$ follows in the first approximation:

(10) $\qquad E \approx \frac{1}{2\pi} \cdot J_0(P_1 \cdot K) \cdot J_0(P_2 \cdot K) \cdot \int_0^{2\pi} du$ $= J_0(P_1 \cdot K) \cdot J_0(P_2 \cdot K)$ This computation of E of a profile of two wave trains proves that in the first approximation the distinguishing function E is proportional to the product of two Bessel's functions in the order of zero.

It can be proved that, in general, the perceptibility E in the first approximation is given by the product of N Bessel's functions in the order of zero for N (N=integral number) wave trains superposing each other. The argument of the $r$th Bessel's function in the order of zero in this product is ($P_r \cdot K$).

The practical consequence of these mathematical interrelationships for the perceptibility E is shown in the graphs of E relative to the elementary cases:

(1) Profile of one wave train $$E = J_0(P_1 \cdot K);\ (P_2 = 0)$$

(2) Profile of two wave trains $$E = J_0(P_1 \cdot K) \cdot J_0(P_2 \cdot K);\ (P_2 = P_1)$$

(3) Profile of three wave trains $$E = J_0(P_1 \cdot K) \cdot J_0(P_2 \cdot K) \cdot J_0(P_3 \cdot K);$$
$$(P_2 = P_1;\ P_3 = 0.6 \cdot P_1)$$

On the basis of the above computations, the perceptibility E is graphically shown in FIGURES 6-8 wherein the abscissa is the product P, K. In FIGURE 6, the profiled plate grooves have a single sine wave form with the maximum crest shown at 26 and minor crests or maxima shown at 27 and 28. In FIGURE 7, two sine waves are used to form the profiled surface and the minor crests 29 and 30 are smaller than in FIGURE 6. In FIGURE 8 wherein three sine waves form the profiled plate the minor crests are negligible.

If the grooves are formed by superposing several sine waves then it is possible to suppress all minor crests below the level of visibility so that the perceptibility $E = 0$. The ideal situation is attained by modifying known grooved profiles consisting in a chain of segments of circles, i.e. by a statistically distributed modulation.

The particularly significant feature of this embodiment is to be seen in that each single groove basically is parabolic, but either the extension of the groove or its depth or both follow a modulating pattern.

To be more precise, it has been found that if the grooves are modulated in a manner similar to the modulation of the grooves on record discs, the distance of adjacent, neighboring grooves may thus vary in a more or less statistical manner, but the maximum deviation from the average distance and thus the maximum angle of deflection still can be very accurately determined.

It is assumed that the profile will be carved by a stylus in a manner similar to the carving of grooves on record discs. It shall be noted that basically two types of tracks are possible. One can use the so-called Edison recording tracks whereby the depth of the grooves vary in accordance with the modulation impressed thereupon. The other method uses lateral recording tracks in which the grooves are deflected perpendicular to their general direction of extension. A third method uses a combination of Edison and lateral tracks.

It has been found to be of high advantage to control the stylus carving the grooves in the plate in accordance with the present invention, by a low frequency noise spectrum limited by means of a low pass filter having a damping characteristics proportional to $1/f^2$ for frequencies above the cut-off frequency $f_0$. FIGURE 9 illustrates the ratio of output to input voltage for such filter in dependency of the frequency.

Figure 10:
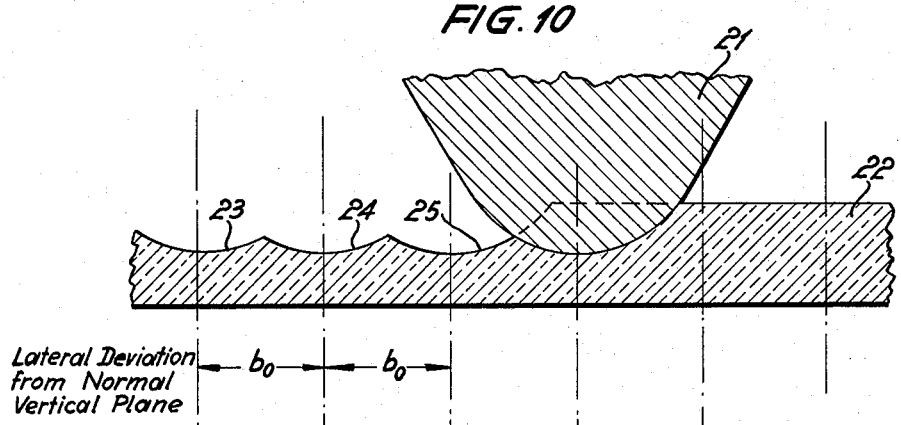
FIGURES 10, 11 and 12 illustrate modes of making brightness distributing plates in accordance with the instant invention.

According to FIGURE 10, a stylus 21 carves grooves 23, 24 and 25 into disc 22. If the stylus is only moved perpendicularly to the plane of the drawing, parallel grooves will be produced; in other words, the grooves 23, 24 and 25 then extend strictly perpendicularly to the plane of the drawing in equidistant relationship with respect to each other. $b_0$ is the constant distance between such grooves.

Figure 11:
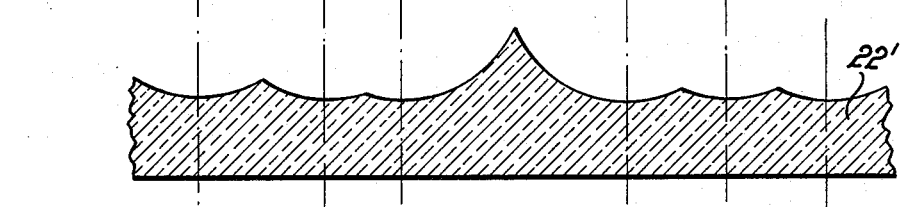

As shown in FIGURE 11, one can impose lateral (horizontal) deflections upon the stylus 21. Such deflections are indicated by the arrows whereby the negative sign means a deflection towards the left and a positive sign means a deflection of the stylus towards the right; deflection being understood with respect to the normal distance ($b_0$) as evidenced by the dash-dot lines indicating the relationship between the various grooves shown in FIGURES 10, 11 and 12.

Figure 12:
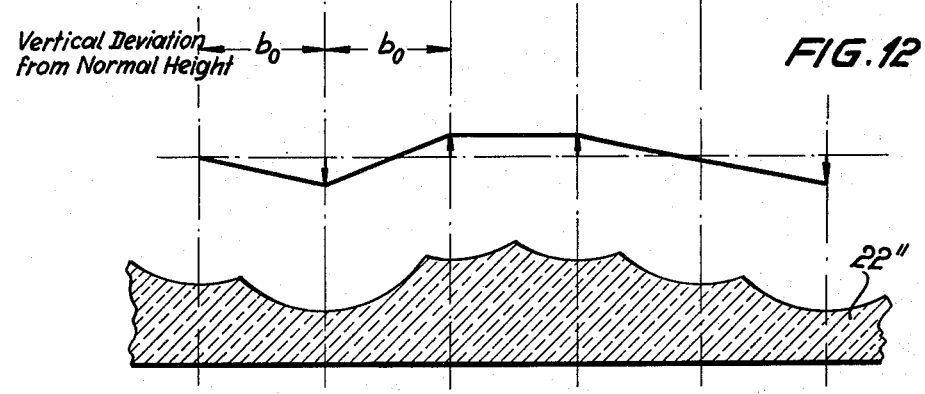

In FIGURE 12 it is shown that the stylus has been modulated so as to deflect in a vertical direction and the arrows indicate whether there is an increase or a decrease in carved depth.

Owing to the modulation of the grooves carved into the plate, the maximum angle of deflection which determines the maximum deflection in vertical direction of any light beam coming from the TV scanning lines varies. Thus the maximum angle of deflection by diffraction varies from groove to groove as well as within every groove, and there is present a statistical varying of maximum angle of refraction within accurately definable limits.

These limits can be further explained in the following manner. The object of this invention is to enlarge the image spots transversely to the line structure. Essentially enlargements of these image spots parallel to the line structure should be avoided. Some enlargement of the dots along the line structure is permitted, but this enlargement must be less than $\frac{1}{7}$ of the enlargement transversely to the lines. The subsequent formulas define the limits of both vertical and lateral modulation to fulfill the above mentioned conditions.

The average distance between adjacent grooves was designated above by $b_0$. The radius of curvature of the carving portion of the stylus is $r$; further it is assumed that $m$ is the degree of modulation of the maximum angles of diffraction. The amplitudes of deflection of the stylus are then:

$$h_T = \frac{b_0^2 m}{2r} \text{ (Edison track)}; \quad h_s = \frac{b_0 m}{2} \text{ (lateral track)}$$

The upper limit $h_{max}$ of the amplitude of deflection is determined by the cut-off frequency $f_0$ of the low pass filter and further it depends upon the velocity of the stylus, which velocity may be denoted with $V_s$. This relationship is due to the fact that no appreciable deflection shall occur in the direction of the general extension of the grooves corresponding to the horizontal direction of the TV scanning lines. The upper limit for the deflection amplitude is given by the equation $$h_{max} = \frac{V_s}{140 \cdot f_0}$$

For all these brightness distributing plates having grooves in a manner as described above, the quality of the profile of the grooves has to be a considerably high one. The grooves are relatively small, and therefore it is not easy to obtain the desired accuracy. It is necessary to keep constant and uniform the desired form of each groove within the prescribed limits. It is further necessary to have the surface of the grooves themselves very well polished and smooth. The plate having such grooves is to be effective as a light diffraction means without incurring light losses or at least without incurring appreciable light losses.

From the foregoing it appears therefore advisable to simplify the construction of a grooved plate. In accordance with another embodiment of the instant invention, it is suggested to make the plate out of two discs which are combined and disposed between the fluorescent screen of the TV picture tube and the viewer. These two discs have matching profiles but different indices of refraction. The grooves and their profile are provided as boundaries of the disc and they are matched so that they can be put together in a complete fitting relationship without leaving holes or air space inbetween.

Figure 13:
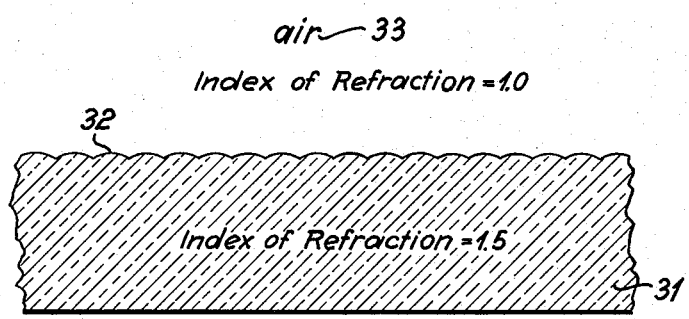
FIGURE 13 is a sectional view of a brightness distributing plate in accordance with the prior art.

Such combining of two discs having different indices of refraction exhibits the phenomenon whereby there is not any more the usual strong refraction between disc and air as take place according to FIGURE 13, but the effective refraction for deflection is carried out at the boundary of the two discs, i.e. in the interior of the combined plate because of the different indices of refraction of the materials of the two discs. This difference between the two indices may be a very slight one.

Figure 14:
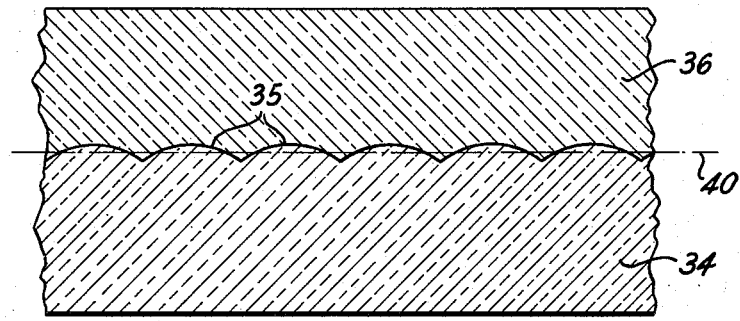
FIGURE 14 is a cross-section through a grooved brightness distributing plate in accordance with another embodiment of the present invention.

FIGURE 14 illustrates an example for such grooved plate. This plate comprises two discs 34 and 36 whereby the disc 34 has a profile with convexly curved arc sections taken in a cross-section perpendicularly to the extension of semi-cylindrical grooves. The disc 36 has a concaved profile matching the convex profile of disc 34. Discs 34 and 36 are combined, thus defining as a boundary an inner profile surface 35. The discs have different indices of refraction and therefore refraction occurs at profile surface 35.

The two grooved discs thus combined to form a single brightness distributing plate, can be also used as television glasses worn directly by the viewer in front of his eyes. In this case, preferably the profile of the two discs is symmetrical to the average boundary between the two discs.

Figure 16:
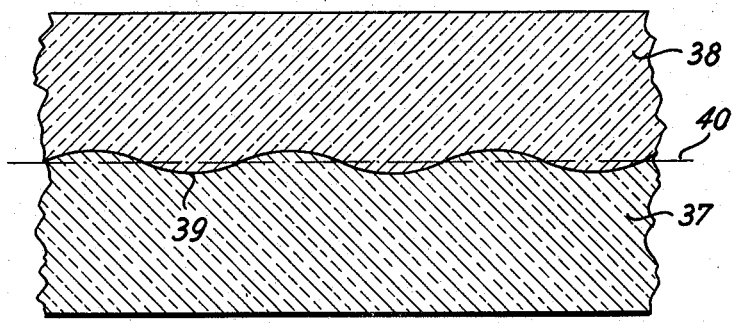
FIGURE 16 is a cross-sectional view of the two combined parts of the brightness distributing plate according to the embodiment of the invention illustrated in FIGURE 15.

FIGURE 16 illustrates another embodiment of the invention showing in cross-section two discs 37 and 38 which are joined along a boundary defining a profile 39 which is, in cross-section, a sinusoidal curve.

Figure 15:
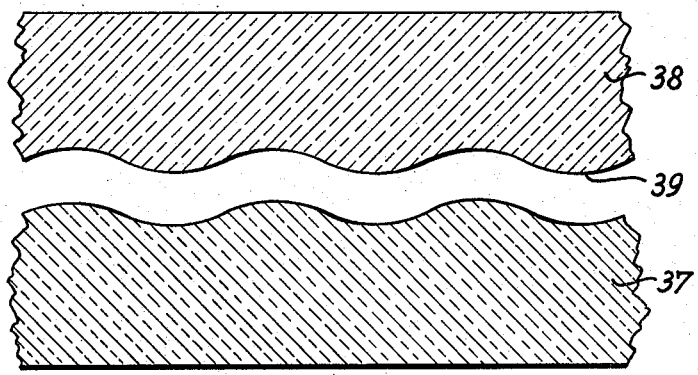
FIGURE 15 illustrates in a cross-sectional view the two parts for making a brightness distributing plate according to a further embodiment of the present invention.

FIGURE 15 illustrates the two discs 37 and 38 separately, before they are combined to a single plate.

In case a device with periodically and symmetrically shaped boundary for plates is used in television glasses worn directly by the viewers, it has been found that the human eye is well adjusted to horizontal sharpness of the picture; the vertical diffraction of light at the profile 35 or 39 is fully effective for the removal of the line structure of the television picture. This particular example, illustrated in FIGURE 16, shows that the average dividing plane 40 of the two discs 38 and 39 not only is a center plane but also defines a plane of symmetry with regard to the profile 39. This particular symmetrical profile has been found as highly suitable for the adjustment of the human eye to still perceive full sharpness of any horizontal contrast in the TV pivture but removing optically completely the line structure thereof. The outer surfaces of the plates illustrated in FIGURES 14 and 16 are completely smooth and, of course, highly polished. The profiled boundary in the plates used for the removal of the scanning line structure is completely protected against damage, and also no dirt can collect in any groove.

In order to manufacture plates such as illustrated in FIGURES 14 and 16, it is also of advantage to use discs having not only different indices of refraction but also a different softening point. In this case the disc with a higher softening point serves as a basis, and the disc with the lower softening point is then pressed upon the other disc with the higher softening point in order to fully secure matching profile.

Looking, for example, at FIGURE 15, suppose the prepared disc 37 has the higher softening point, then the disc 38 need not be prepared with regard to its particular profile, but disc 38 need only be heated up to a temperature above its softening point but still below the softening point of disc 37. Then the disc 38 is pressed upon disc 37, and thus the profiled inner boundary 39 is formed thereby; brightness distributing plate is completed by cooling and polishing the combined discs.

Alternatively, one can weld, cast or die-cast transparent, softened material upon a profiled and prepared disc having a higher softening point.

In the following, the laws of physics involved to produce the brightness distributing effect at such an inner boundary shall be explained briefly.

Assuming again that $l$ is the required maximum width of diffraction to be produced by such brightness distributing plate, in order to remove visually the line structure of a television picture; assuming further that $a$ is the distance between the average profile surface (plane 40) and the fluorescent layer of the picture tube, and assuming further that $n_1$ is the index of refraction of one disc, while $n_2$ is the index of refraction for the other disc; assuming finally that $b$ is the distance between adjacent grooves, each having a radius of curvature $r$ (FIGURE 14) then the following equation is true, independent from any sign:

$$\frac{b}{r} \cdot (n_1 - n_2) = 2 \cdot \frac{l}{a}$$

The difference between the two indices of refractions is related to the geometrical configuration and position of the plate as follows:

$$\Delta n = n_1 - n_2 = \pm 2 \cdot \frac{l}{a} \cdot \frac{r}{b}$$

In case one does not have such double disc plate as illustrated in the prior art example shown in FIGURE 13, then, of course, one index of refraction would be equal to the index of refraction of air, which is approximately unity; consequently, the above defined difference would be relatively large, because the indices of refraction of transparent synthetics or plastics vary within relatively small limits and have values of about 1.5 to 1.6. Thus, difference $\Delta n$ of the indices of refraction would amount to .5 and .6 in case one has to consider refraction with occurring at a boundary plate-air. In FIGURE 13, a diffraction plate 31 has a profile surface 32 which forms a plate-air boundary with the air indicated at 33.

However, in the embodiment illustrated in FIGURE 14 the difference of index of refraction is to be taken between the two materials the discs 34 and 36 are made of, and in this case this difference $\Delta n$ can be actually made as small as desired.

It is, of course, apparent, when this difference of refraction is very small, the ratio $$\frac{l \cdot r}{a \cdot B}$$

is also very small. It has been found that a suitable selection of the factors involved for easy manufacture of such grooved discs for a diffraction plate is only possible if the ratio of $$\frac{r \cdot l}{a \times b}$$

is in fact very small; in other words, easy manufacture is only possible if there is only a slight difference between the indices of refraction of the two plates 34 and 36. The manufacture of grooved plates made in the form of a double disc as shown, for example in FIGURE 14, is thus simpler than any of the previously described embodiments having an outer profile surface with a refraction occurring with respect to air whereby a relatively large difference of index of refraction is to be taken into account.

It has been found quite possible that the difference of the two indices of refraction can be selected below .1, even down to .001. Thus, the difference between the indices of refraction can be reduced by a factor of $\frac{1}{600}$ as compared with plates having an outer profile.

If for example, the values for $l$ and $a$ are retained, the ratio of $b/r$ can be selected considerably larger as if there were direct reflection between the grooved plate and the air. Thus, in obtaining the same brightness distributing effect, one can increase the distance of between neighboring grooves without necessarily having to decrease the radius of curvature. It has been found that with $r/b$ being larger than .7 but smaller than 2, a width of deflection of about .75 millimeter at a distance $a=7.5$ millimeters is produced, and one obtains a very good removal of the line structure of the television picture; such grooves are very easily made. In this case, for example, one can select a distance between neighboring grooves of $b=.2$ millimeter and each groove has a radius of curvature of also .2 millimeter. In this case the difference between the indices of refraction assumes a ratio of $\pm .2$. This is very easily carried out with two different plastic discs.

As mentioned above, the diffraction plates can also be used as television glasses worn directly by the viewer. If this is the case, of course, the distance between the brightness distributing plate and the fluorescent layer in the television tube is relatively large and may, for example, be 1.5 meters; the desirable width of deflection still is about 0.75 millimeters. Assuming again a value of $$\frac{r}{b} = l$$

above given equation produces for the necessary difference in the index of refraction of value $+=.001$. This also is very easily obtainable because the values for index of refraction for various plastics are known up to about $\frac{1}{100}$ of 1% (fourth decimal).

It may be repeated that for the above mentioned calculation the distance between the brightness distributing plates and the fluorescent layer was selected of 1.5 meters in case the plates are worn as glasses directly by the viewer. Ordinarily, a distance of 1.5 meters between viewer and screen of the television set is hardly tolerable and would result in a considerable strain on the eyes of the viewer. However, it has been found that with such glasses, the line structure of the picture is completely removed and there is no such strain anymore; thus, the viewer can enjoy a considerably larger and more detailed picture than it was possible prior to this invention.

The invention is not limited to the embodiments described above but all changes and modifications thereof not constituting departments from the spirit of the scope of the invention are intended to be covered by the following claims.

What is claimed is:

1. An optical device for the removal of visible line structure in pictures on the video screen of a television tube and comprising a transparent optical diaphragm between the viewer and the picture produced on the video screen, said diaphragm having a plurality of grooves parallel to the line structure on the video screen and spaced closer than the spacing between picture lines, said parallel grooves having curved profile $p$ as a function of an ordinate $q$ measured perpendicularly to the extension of said grooves, with the maximum value of the term $$a(n-1)\frac{dp}{dq}$$

being of the order of magnitude of the distance between two neighboring scanning lines and at least half of said distance, in which term $a$ is the distance between said video screen and the grooved portion of said diaphragm, and $n$ is the index of refraction of said diaphragm.

2. An optical device as claimed in claim 1, said diaphragm being a part of said television tube, the outer surface thereof being adjacent the area of picture production and having said plurality of grooves.

3. An optical device for the removal of visible line structure in pictures on the video screen of a television tube and comprising a transparent optical diaphragm between the viewer and the picture produced on the video screen, said diaphragm having a plurality of grooves parallel to the line structure on the video screen and spaced closer than the spacing between picture lines, said grooves each having a curved cross-section and a depth T having substantially the following relationship:

$$T = \frac{l \cdot b}{4a(n-1)}$$

in which $l$ constitutes the scope of deflection which equals at least the interval of the lines, $b$ the distance between the grooves corresponding at least to a fractional part of the interval between the lines, $a$ the distance between the groove section and the luminous surface and $n$ the index of refraction of the material of the optical diaphragm, the rate of the distance $b$ being from $\frac{1}{5}$ to $\frac{1}{20}$ of the image distance between the lines.

4. An optical device as claimed in claim 3 wherein said optical diaphragm has a non-periodic grooved surface comprising a statistical distribution of the angle of refraction, the average width of said grooves being small with respect to the distance between lines.

5. An optical device as claimed in claim 4, said grooves each having an irregularly varying depth.

6. An optical device as claimed in claim 5, said irregularly varying depth corresponding to low frequency noise spectrum modulation.

7. An optical device as claimed in claim 4, said grooves each having an irregularly varying width.

8. An optical device as claimed in claim 7, said irregularly varying width corresponding to low frequency noise spectrum modulation.

9. An optical device as claimed in claim 3, wherein said optical diaphragm has a periodically grooved surface (profile) the average depth of said grooves being about $\frac{1}{40}$ of the distance between the lines.

10. An optical device for the removal of visible line structure in pictures on the video screen of a television tube and comprising a transparent optical diaphragm between the viewer and the picture produced on the video screen, said diaphragm having a plurality of grooves parallel to the line structure on the video screen and spaced closer than the spacing between picture lines, and a second brightness distributing plate having a grooved surface similar to the surface of said first plate, said plates having indices of refraction 1.5 to 1.6, the indices of said plates differing from each other by 0.001 to 0.1, said plates being joined with their grooved surfaces in mesh.

11. An optical device for the removal of visible line structure in pictures on the video screen of a television tube and comprising a transparent optical diaphragm between the viewer and the picture produced on the video screen, said diaphragm having a plurality of grooves parallel to the line structure on the video screen and spaced closer than the spacing between picture lines, and a second brightness distributing plate having a grooved surface similar to the surface of said first plate, said plates being joined with their grooved surfaces in mesh, said two joined plates being positioned in front of the luminous surface of said television tube, said two plates having differing indices of refraction each index being in the range of 1.5 to 1.6.

12. An optical device for the removal of visible line structure in pictures on the video screen of a television tube and comprising a transparent optical diaphragm between the viewer and the picture produced on the video screen, said diaphragm having a plurality of grooves parallel to the line structure on the video screen and spaced closer than the spacing between picture lines, and a second brightness distributing plate having a grooved surface similar to the surface of said first plate, said plates being joined with their grooved surfaces in mesh, said plates having differing indices of refraction with each index being in the range of 1.5 to 1.6 said two plates having different softening points, the plate having the lower softening point being spread out upon the plate having the higher softening point at a temperature according to said lower softening point.

References Cited in the file of this patent
UNITED STATES PATENTS

| | | |
|---|---|---|
| 2,567,713 | Kaplan | Sept. 11, 1951 |
| 2,728,013 | Tourshou | Dec. 20, 1955 |
| 2,740,954 | Kleefeld | Apr. 3, 1956 |
| 2,746,030 | Schrecongost | May 15, 1956 |
| 2,977,412 | Rhodes | Mar. 28, 1961 |